United States Patent
Moon et al.

(10) Patent No.: US 9,740,977 B1
(45) Date of Patent: Aug. 22, 2017

(54) METHOD AND SYSTEM FOR RECOGNIZING THE INTENTIONS OF SHOPPERS IN RETAIL AISLES BASED ON THEIR TRAJECTORIES

(75) Inventors: Hankyu Moon, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 781 days.

(21) Appl. No.: 12/455,295

(22) Filed: May 29, 2009

(51) Int. Cl.
*G06N 5/00* (2006.01)
*G06N 7/00* (2006.01)
*G06T 7/00* (2017.01)

(52) U.S. Cl.
CPC ............ *G06N 5/00* (2013.01); *G06N 7/005* (2013.01); *G06T 7/00* (2013.01)

(58) Field of Classification Search
USPC ....... 705/7.29; 382/181; 379/88.02; 701/200
See application file for complete search history.

(56) References Cited

U.S. PATENT DOCUMENTS

| | | | | |
|---|---|---|---|---|
| 6,088,428 A * | 7/2000 | Trandal | ............... | H04M 3/382 379/189 |
| 6,228,038 B1 * | 5/2001 | Claessens | ............... | A61B 3/113 351/210 |
| 6,659,344 B2 | 12/2003 | Otto et al. | | |
| 7,006,982 B2 * | 2/2006 | Sorensen | ............... | G06Q 30/0201 705/7.29 |
| 2002/0085092 A1 | 7/2002 | Choi et al. | | |
| 2002/0161651 A1 * | 10/2002 | Godsey | ............... | G06Q 20/202 705/22 |
| 2003/0002712 A1 * | 1/2003 | Steenburgh | ............... | G06K 9/00778 382/103 |
| 2003/0053659 A1 | 3/2003 | Pavlidis et al. | | |
| 2004/0120581 A1 * | 6/2004 | Ozer | ............... | G06K 9/00335 382/224 |
| 2004/0131254 A1 * | 7/2004 | Liang | ............... | A61B 5/1113 382/181 |
| 2005/0102183 A1 | 5/2005 | Kelliher et al. | | |
| 2005/0288911 A1 * | 12/2005 | Porikli | ............... | G06K 9/00335 703/2 |

(Continued)

*Primary Examiner* — Talia Crawley

(57) ABSTRACT

The present invention is a method and system for automatically recognizing which products a shopper intends to find or purchase based on the shopper's trajectory in a retail aisle. First, the system detects and tracks the person to generate the trajectory of the shopper. Then some of the dynamic features are extracted from the shopper trajectory. The shopper trajectory features of a given trajectory are typically the positions, the motion orientations, and speeds at each point of the trajectory. A shopper behavior model is designed based on some of the primitive actions of shoppers. The last step of the method is to analyze a given shopper trajectory to estimate the shopper's intention. The step either utilizes decision rules based on the extracted shopper trajectory features, or utilizes a trained Hidden Markov Model, to estimate the progression of the primitive actions from the trajectory. The decoded progression of the shopper behavior states is then interpreted to finally determine the shopper's intention.

16 Claims, 17 Drawing Sheets

(56) References Cited

U.S. PATENT DOCUMENTS

| | | | |
|---|---|---|---|
| 2006/0010028 A1* | 1/2006 | Sorensen | G06Q 30/02 |
| | | | 705/7.34 |
| 2007/0067221 A1 | 3/2007 | Godsey et al. | |
| 2007/0244630 A1* | 10/2007 | Toyoshima | G06Q 10/04 |
| | | | 706/18 |
| 2008/0005045 A1* | 1/2008 | Sorensen | G06Q 10/063 |
| | | | 705/500 |
| 2008/0018738 A1 | 1/2008 | Lipton et al. | |
| 2008/0042836 A1 | 2/2008 | Christopher | |
| 2008/0159634 A1* | 7/2008 | Sharma et al. | 382/224 |
| 2008/0243614 A1* | 10/2008 | Tu | G06Q 30/02 |
| | | | 705/14.66 |

\* cited by examiner

METHOD AND SYSTEM FOR RECOGNIZING THE INTENTIONS OF SHOPPERS IN RETAIL AISLES BASED ON THEIR TRAJECTORIES

FEDERALLY SPONSORED RESEARCH

The invention was made partially with U.S. Government support under Grant No. 0548734 awarded by the National Science Foundation. The U.S. government has certain rights in the invention.

CROSS-REFERENCE TO RELATED APPLICATIONS

Not Applicable

SEQUENCE LISTING OR PROGRAM

Not Applicable

BACKGROUND OF THE INVENTION

Field of the Invention

The present invention is a method and system to recognize which product a shopper intends to find or purchase based on the shopper's trajectory in a retail aisle.

Background of the Invention

The current consumer and market-oriented economy places a great deal of importance on shoppers' behavior and decision making process in a retail space—how shoppers look for and interact with products and how they make purchase decisions while shopping in stores. There is also a consensus within the market research community that today's consumers make most of their purchase decisions in stores. Until shoppers finally make decisions to purchase certain products, they often make comparisons with alternative products and try to gather more information about them. Even when they don't purchase some of the items with which they interacted, the information about the interactions themselves—which products they were interested in and how much time they spent with the products—constitutes very valuable marketing data. Transaction data alone is not able to provide such information.

Consumer interaction with products occurs in retail spaces at an immeasurably high number and frequency. Consumer behavior often changes according to time of the day, season, and economic environment. It would, therefore, take much resource to measure the behaviors and generate useful data in order to derive meaningful conclusions, despite these variables. It is the main goal of the present invention to collect and analyze consumer behavior data captured in a retail space using videos. The current state-of-the-art video analytic technology has not advanced enough to recognize very fine detail of human behavior; however, simply measuring how shoppers move around in a retail space has been quite successful due to advances in human tracking technology. Such technology is able to generate a huge amount of consumer trajectory by automatically analyzing videos captured by in-store cameras. The present invention specifically concerns the exploitation of such trajectory data to extract shopper behavior information.

In a typical shopping scenario, a shopper browses through retail aisles with an intention to buy certain products or to look for any desirable products. Then she/he notices a product or product category that catches her/his attention (regardless of whether it was intended or not), approaches the shelf, interacts with products, and makes a decision as to which one to buy or not to buy at all. If the shopper becomes interested, she/he engages with the product or category by approaching and stopping at the shelf. Then she/he directly interacts with the intended product or further explores different options within the category or other categories. The interaction involves checking the price, reading the labels, placing the item in the shopping cart, or returning the item to the shelf. The shopper then makes a decision to pick up the product, and continues to browse for other products. Alternatively, the shopper can return the product to the shelf and look for other products in the same categories. It is one of the goals of the present invention to recognize such behaviors based on the shopper's trajectory.

Recent developments in computer vision and artificial intelligence technology make it possible to detect and track people from video sequences so that their trajectories can be estimated. More specifically, body detection can locate any human body images from a video sequence and individually keep track of their movements, so that the system can estimate each shopper's positions over time.

The estimated trajectory contains much information about the shopper's intention at each instance. More specifically, various features—such as position, speed, and orientation of the movement—reveal the shopper's current state. For example, a fast movement to the same direction of the aisle usually tells that the shopper is walking toward a section and has not yet reached the point to look for a particular product. Slower walking reveals that the shopper is in or very near the intended section and is looking for an intended product. Very slow movement or stopping near one of the (left or right) shelves may reveal that the shopper is interacting with a product on that shelf or is standing back from the intended shelf to have a wider view. If the shopper has paused to look for a product and finally finds a product, she/he approaches the shelf to the direction close to the lateral direction. Typical shopping scenarios involve two or more of these behaviors; the progression of the behaviors follows certain patterns.

The present invention provides a method to interpret each shopper's trajectory to make an inference of what the shopper's intention is at the moment. Based on the behavior model mentioned above, the method of the invention interprets the shopping trajectory into such atomic behaviors to further determine the shopper's intention. In one of the exemplary embodiments, the invention adopts a rule-based approach to interpret the shopping trajectories. In another exemplary embodiment, the invention employs a probabilistic graphical model—such as a Hidden Markov Model—to interpret the shopping trajectories.

There have been prior attempts for tracking people's motion for the purpose of understanding their behaviors.

U.S. Pat. Appl. Pub. No. 2002/0085092 of Choi, et al. (hereinafter Choi) disclosed a method for modeling an activity of a human body using the optical flow vector from a video and probability distribution of the feature vectors from the optical flow vector. Choi modeled a plurality of states using the probability distribution of the feature vectors and expressed the activity based on the state transition.

U.S. Pat. Appl. Pub. No. 2003/0053659 of Pavlidis, et al. (hereinafter Pavlidis) disclosed a method for moving object assessment, including an object path of one or more moving objects in a search area, using a plurality of imaging devices and segmentation by background subtraction.

U.S. Pat. Appl. Pub. No. 2004/0120581 of Ozer, et al. (hereinafter Ozer) disclosed a method for identifying the activity of customers for marketing purposes or the activity of objects in a surveillance area, by comparing the detected objects with the graphs from a database. Ozer tracked the movement of different object parts and combined them to high-level activity semantics, using several Hidden Markov Models (HMMs) and a distance classifier.

U.S. Pat. Appl. Pub. No. 2004/0131254 of Liang, et al. (hereinafter Liang) also disclosed the Hidden Markov Models (HMMs) as a way, along with the rule-based label analysis and the token parsing procedure, to characterize behavior. Liang disclosed a method for monitoring and classifying actions of various objects in a video, using background subtraction for object detection and tracking.

U.S. Pat. Appl. Pub. No. 2008/0018738 of Lipton, et al. (hereinafter Lipton) disclosed a video analytics engine and an activity inference engine to generate video primitives and determine whether an activity of interest occurred in a video using the video primitives.

Pavlidis was primarily related to monitoring a search area for surveillance using visual tracking. Choi, Ozer, Liang, and Lipton all define behavior primitives and try to determine whether a given video stream contains the sequence of these primitive behaviors using probabilistic graphical model approaches such as HMM. The present invention employs a similar approach to model the shoppers' behaviors in retail aisles to determine their intentions, but it only requires trajectory data to model and infer the behaviors; it does not need additional visual cues as required in the prior inventions.

There have been prior attempts for tracking customers or measuring customer interactions with products using communication devices for the purpose of understanding customer behaviors.

U.S. Pat. No. 6,659,344 of Otto, et al. (hereinafter Otto) presents a shopper behavior monitoring system using RFID tags attached to products and RFID scanners installed in shopping baskets, so that the system can detect product purchase at the shelf and identify the purchase items. In U.S. Pat. No. 7,006,982 of Sorensen (hereinafter Sorensen) and U.S. Pat. Appl. Pub. No. 2008/0042836 of Christopher (hereinafter Christopher), a shopper is tracked using a wireless tracking device installed in the shopping cart. The trajectory of the shopper is analyzed to deduce the interaction of the shopper with the products. In U.S. Pat. Appl. Pub. No. 2005/0102183 of Kelliher, et al. (hereinafter Kelliher), the comparison between the acquired items and checkout items is made based on the shopper location and behavior estimated from RFID tracking devices, so that potential fraud can be detected. In U.S. Pat. Appl. Pub. No. 2007/0067221 of Godsey, et al. (hereinafter Godsey), the RFID system is used to detect product purchase. In all of these inventions, special devices are installed on shopping baskets/carts and/or attached to products to measure the shopping and purchase behavior of customers. The present invention can also process trajectory data generated from such devices. However, it simply requires the shoppers' trajectory data, and not the data regarding the product displacement. In its primary exemplary embodiment, the present invention utilizes video cameras to track shoppers and generate trajectories without using any costly and cumbersome devices. Unlike some of the mentioned prior inventions, the present invention does not depend on the movement of the carts—which limits the scope of the application—to track the customer behavior.

In summary, the present invention provides an approach to analyzing a shopper's trajectory in retail aisles to derive the shopper's intention. Unlike some of the prior inventions, the present invention does not require a dedicated communication device to track shoppers' movements or to recognize the displacement of products. Unlike some of the prior inventions, the present invention does not require any visual information—such as identified body parts of the shoppers or the movements of body parts—other than the trajectories of the shoppers. As some of the prior inventions, the present invention utilizes a model of behavioral primitives and the probabilistic relations between them. However, the present invention adopts a set of dynamic behavioral primitives—such as walking, browsing, approaching, and interaction—specifically chosen to deduce which products the shopper intends to examine or buy.

SUMMARY

The present invention is a method and system for automatically recognizing which product a shopper intends to find or purchase based on the shopper's trajectory in retail aisles.

It is one of the objectives of the first step of the processing to generate shopper trajectories. In one of the exemplary embodiments, the step starts with detecting people from a video sequence. The detected people are then tracked individually to generate their trajectories. In another exemplary embodiment, the customer trajectory can be generated from different kinds of video analysis algorithms or from special positioning devices.

It is one of the objectives of the second step of the processing to extract dynamic features from the shopper trajectories. The shopper trajectory features of a given trajectory are typically the positions and the motion orientations and speeds at each point of the trajectory. These trajectory features are specifically chosen to convey information about the shopper's intention to pick up or examine products at specific locations.

It is one of the objectives of the third step of the processing to model the shopper behaviors. The shopper behavior model includes the primitive actions of the shoppers that are relevant to estimating the shopper's intention in a shopping environment. In one of the exemplary embodiments, the step builds and trains a Hidden Markov Model that models the state transitions of shopper behavior. In another exemplary embodiment, the model comprises the relationship between the primitive action primitives extracted from a shopper trajectory and the shopper's intentions.

It is one of the objectives of the fourth step of the processing to analyze a given shopper trajectory to estimate the shopper's intention. In one of the exemplary embodiments, the step utilizes decision rules based on the derived shopper trajectory features. The decision rules determine whether the shopper is interested in the left shelf or the right shelf. In another exemplary embodiment, the step utilizes a Hidden Markov Model to decode the shopper trajectory to generate the progression of states of shopper behavior. The decoded progression of the shopper behavior states determines whether the shopper is interested in the left shelf or the right shelf.

DRAWINGS—FIGURES

DETAILED DESCRIPTION OF THE INVENTION

Figure 1:
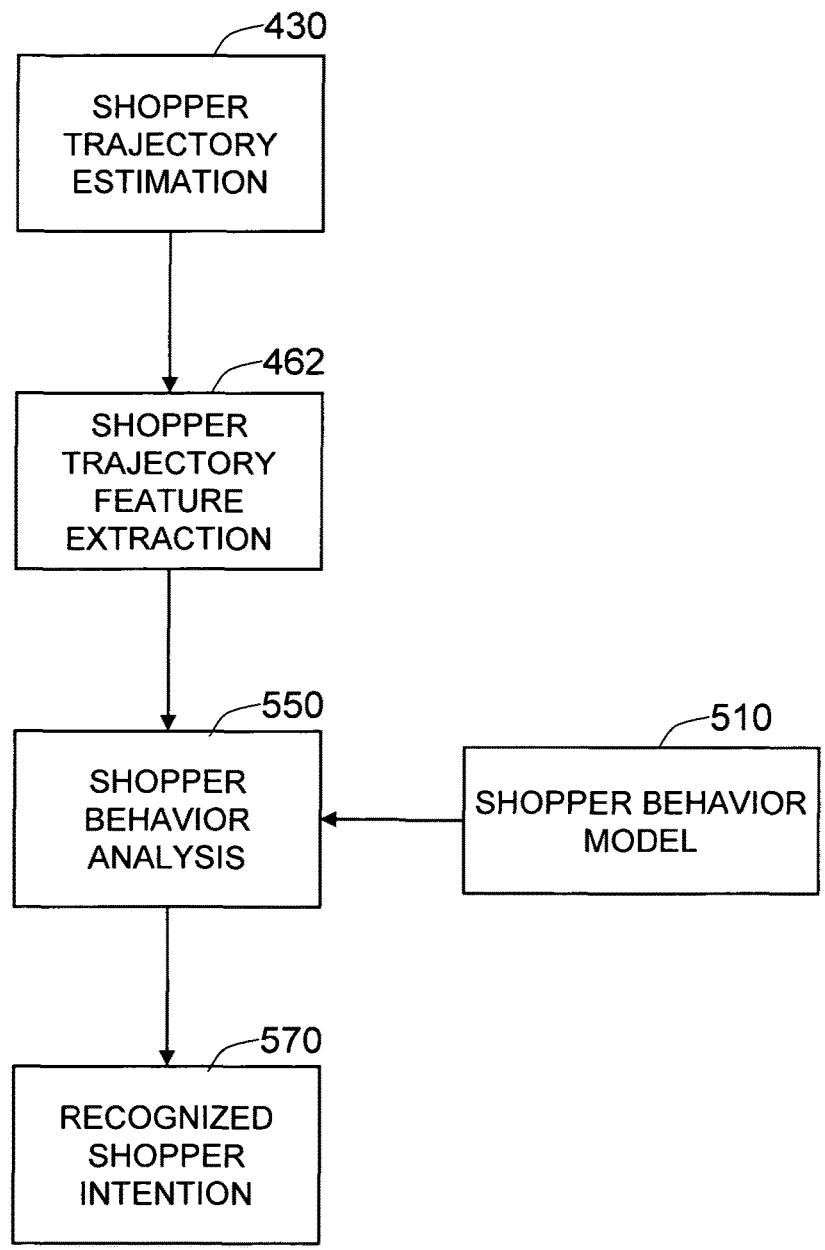
FIG. 1 is an overall scheme of the system in a preferred embodiment of the invention.

FIG. 1 is an overall scheme of the system in a preferred embodiment of the invention. The shopper trajectory estimation 430 step detects and tracks shoppers from an input video sequence and generates their trajectories. Then the shopper trajectory feature extraction 462 step derives dynamic features from the raw trajectory that provide information relevant to recognizing shopping behaviors. The shopper behavior model 510 concerns the relationship between the trajectories of shoppers and their behavior—the behavior revealing the intentions of the shoppers. In one of the exemplary embodiments, the shopper behavior model consists of the relationship between the trajectory dynamics (position, speed, and orientation of the trajectory) and atomic behaviors (walking, browsing, approaching, and interaction). Given a shopper's trajectory and the extracted shopper trajectory features 460, the shopper behavior analysis 550 step then analyzes them based on the shopper behavior model 510. The step finally produces the recognized shopper intention 570.

Figure 2:
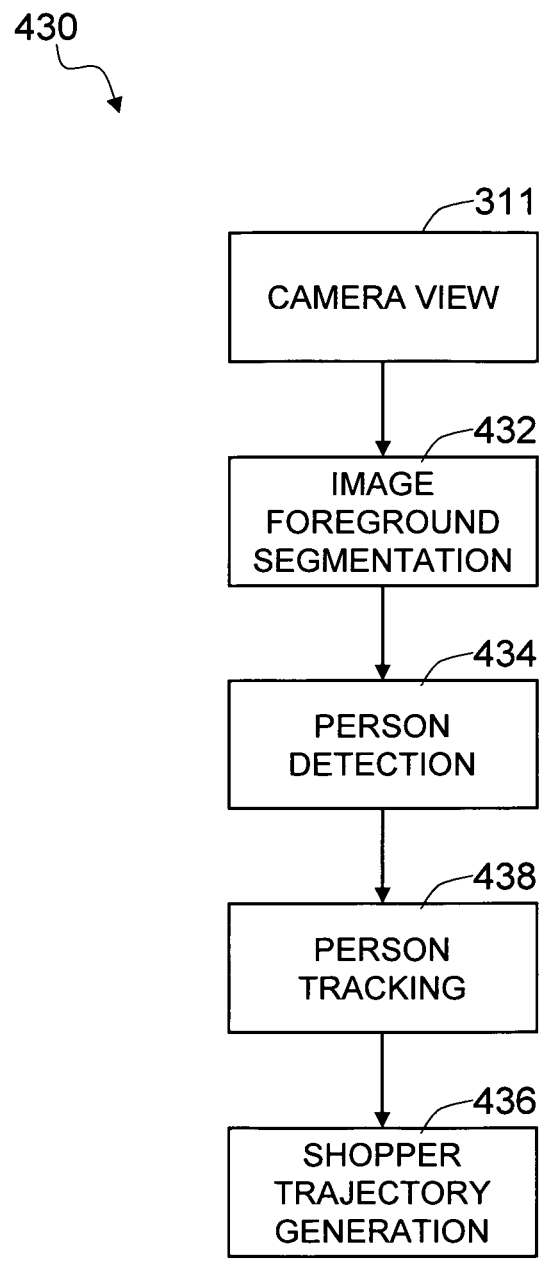
FIG. 2 shows an exemplary embodiment of the shopper trajectory estimation step.

FIG. 2 shows an exemplary embodiment of the shopper trajectory estimation 430 step. From a camera view 311 that captures the movements of shoppers in a store space, the image foreground segmentation 432 step first segments out the regions in the view that potentially contain the shoppers. The person detection 434 step specifically searches for the shoppers individually, so that the next person tracking 438 step can keep their identities through the frames. The shopper trajectory estimation 430 step records the tracked movements of the shoppers in an appropriate form so that they can be further analyzed in the following steps.

In one of the exemplary embodiments, the person detection 434 step utilizes a machine learning-based human body detector, where a learning machine is trained to determine whether or not a given image contains a human body. In one of the exemplary embodiments, the person tracking 438 step utilizes a multi-hypothesis tracker based on a particle filtering technique.

Figure 3:
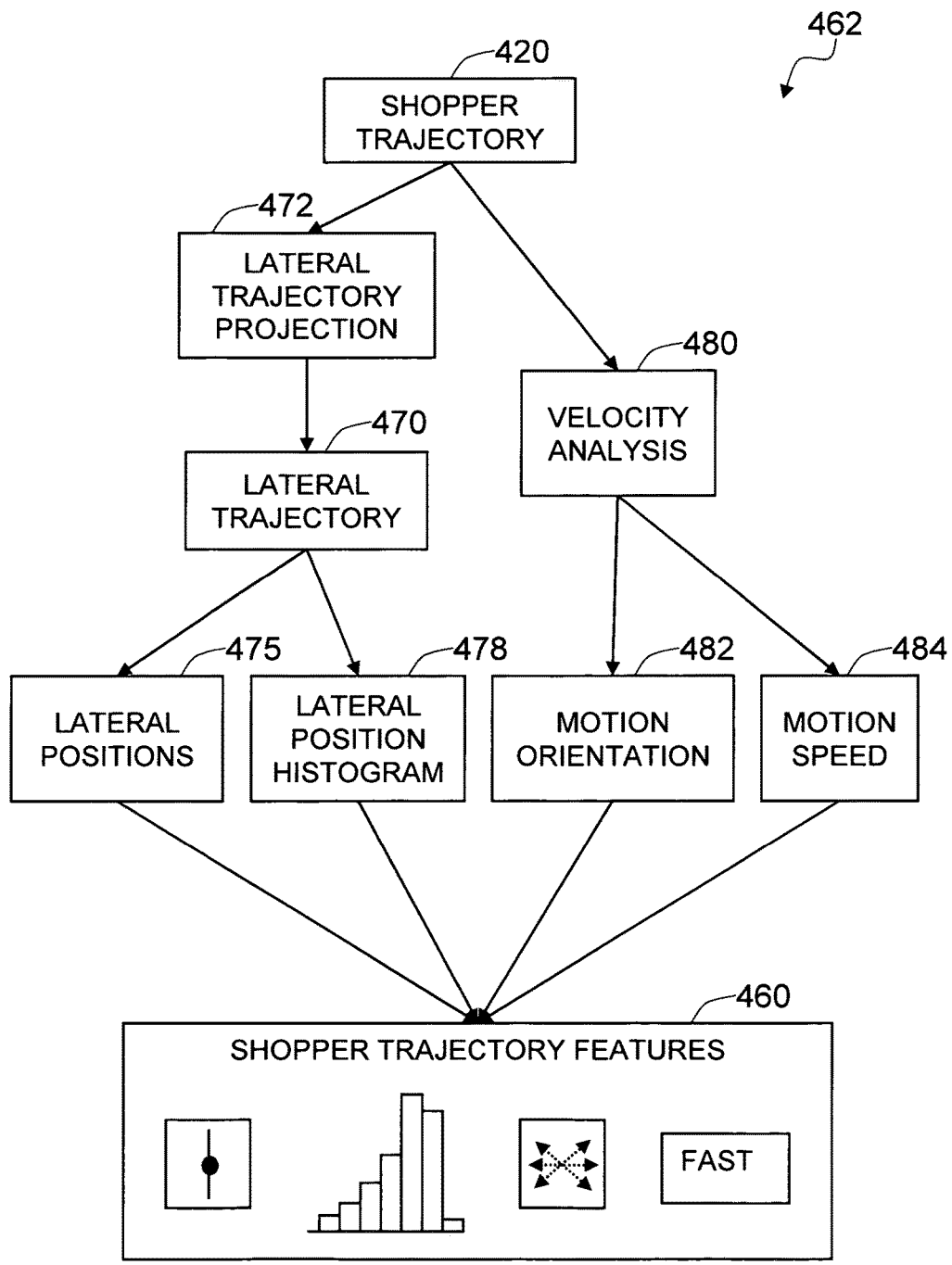
FIG. 3 shows an exemplary embodiment of the shopper trajectory feature extraction step.

FIG. 3 shows an exemplary embodiment of the shopper trajectory feature extraction 462 step. The step aims to derive features from a raw shopper trajectory 420 that provide information relevant to recognizing the shopper's intention. The step is necessary because very simple and straightforward interpretation of trajectory information—such as the proximity of the shopper to shelf space—often fails to recognize the shopper's intention. For example, when a shopper is interested in a product in R(ight)-shelf, she may stand close to the opposite side—L(eft)-shelf—to have a better view of the R-shelf before approaching the product of interest. Based on observations on the trajectories and the shoppers' behaviors, various dynamic cues of the trajectories can be combined to provide more accurate and reliable interpretations of the trajectories.

The lateral trajectory projection 472 step first projects the trajectory in the spatiotemporal space (x, y, t) into the (y, t) space to generate the lateral trajectory 470. The projected lateral trajectory retains most of the information for determining the shopper's intention regarding whether she is interested in the L-shelf or R-shelf. Then the sequence of lateral positions 475 is extracted from the lateral trajectory 470. The lateral position histogram 478 also provides information about where the shopper has spent the majority of time, which is also another source of cues regarding the shopper's intention.

The velocity analysis 480 step extracts the velocity of the shopper at each point in the trajectory. Both the orientation of the motion 482 and the speed of the motion 484 carry information about which state the shopper is currently going through. For example, when the shopper's current goal is to move to a section where she can look for products that she wants, the trajectory at that moment would typically move fast along the same direction as the aisle. Both the motion orientation 482 and the motion speed 484 are extracted from the velocity analysis 480 step.

The final shopper trajectory features 460 include four of the mentioned modalities: lateral positions 475, lateral position histogram 478, motion orientation 482, and the motion speed 484.

Figure 4:
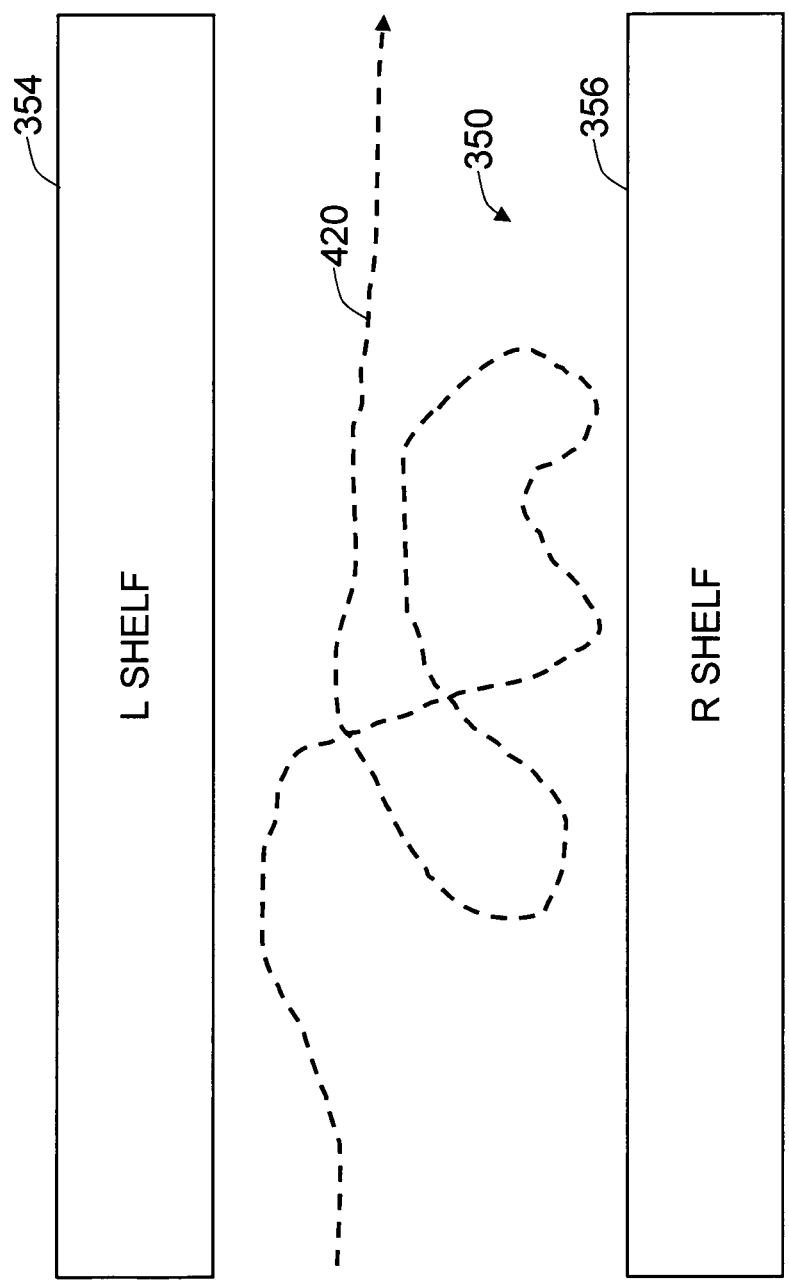
FIG. 4 shows an exemplary trajectory of a shopper generated from the shopper trajectory estimation step.

FIG. 4 shows an exemplary trajectory of a shopper generated from the shopper trajectory estimation 430 step. The shopper walks into an aisle 350, and looks for products that she wants to further investigate or to pick up and purchase. The products of interest are in the R-shelf 356 shown in the figure. She slows down and walks away from the R-shelf 356 (toward L-shelf 354) to look for the product, before approaching the R-shelf 356 to get closer to the found products. She then spends some time to examine or pick up the products. In the scenario shown in the figure, the shopper compares some of the products with other products in the same R-shelf 356 by repeatedly stepping away and into the R-shelf. Then the shopper leaves the aisle by walking away toward the same direction as the entrance. The generated trajectory itself does not have all of the behavioral information; still very crucial information can be uncovered from it—such as in which product the shopper was interested, to which other product the shopper made a comparison, and how much time the shopper spent on each product. It is necessary to extract information from the raw trajectory that is relevant to collecting such behavioral data.

Figure 5:
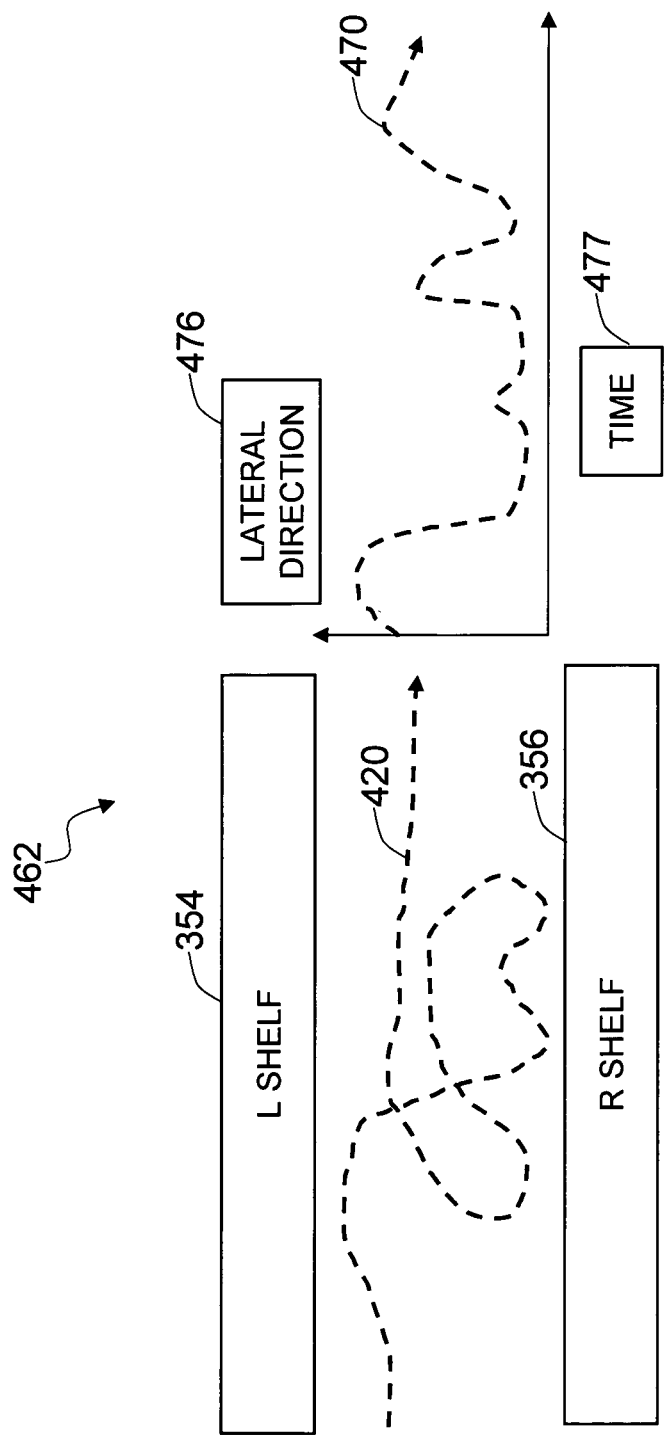
FIG. 5 shows an exemplary embodiment of the trajectory feature extraction step.

FIG. 5 shows an exemplary embodiment of the shopper trajectory feature extraction 462 step. In this embodiment, the movement of the shopper over time along the lateral direction 476—the direction perpendicular to the aisle direction—has been extracted, as shown in the right diagram. The lateral motion is simply the projection of the shopper trajectory 420 over space (x, y) and time to the lateral direction 476 and the time 477. The motion of the shopper shown in the lateral trajectory 470 has more relevance to estimate the intention of the shopper—whether the shopper is interested in the L-shelf 354 or the R-shelf 356. It also makes it easier to express the speed of motion, so that the amount of time that the shopper spent at each position along the lateral direction 476 can be estimated; the extracted feature contains the information regarding the lateral position of the shopper as well as the speed of motion. The lateral trajectory only loses information regarding the motion of the shopper to the direction of the aisle. The motion to the aisle direction has been found not to be useful to derive a shopper's intention regarding at which (left or right) shelf to engage and devote time.

Figure 6:
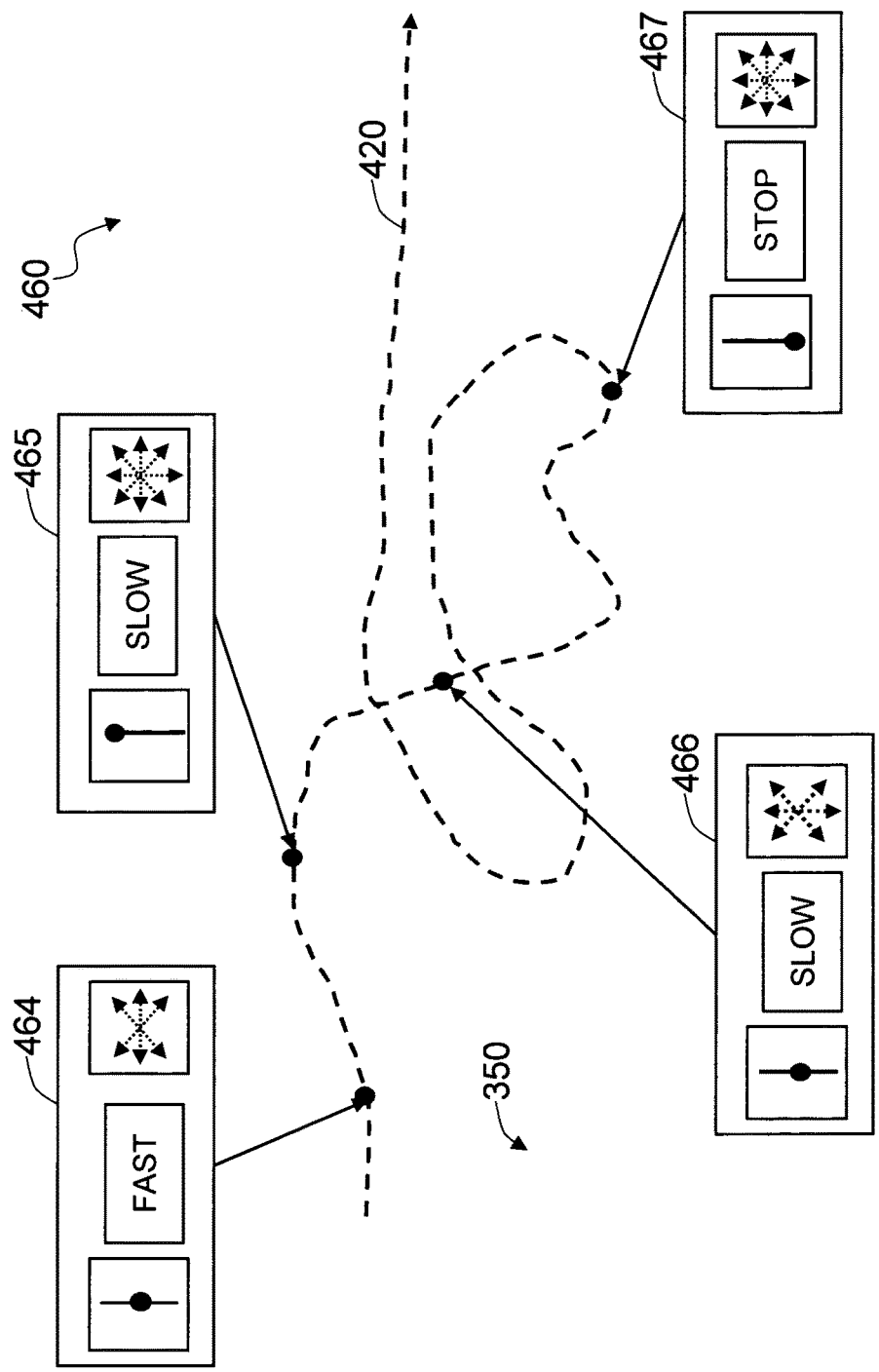
FIG. 6 shows an exemplary embodiment of extracted shopper trajectory features.

FIG. 6 shows an exemplary embodiment of extracted shopper trajectory features 460. A shopper walks into an aisle 350 where she intends to find a product to buy. The shopper trajectory 420 shows the movement. Until the product or the section is found, the motion is typically fast and is along the direction of the aisle. In this stage, the goal is to reach the intended section; the shopper usually walks close to the median of the aisle, without much bias toward left or right. The shopper trajectory features for walking 464 summarize the observation. Once the shopper arrives at the section, the movement slows down and the direction of the motion can become more diverse. The shopper can either walk slowly to find the exact product that she wants, or stand back toward the opposite shelf to have a better view of the intended shelf. The extracted shopper trajectory features for browsing 465 reflects such dynamic behavior. As soon as the shopper finds the product of interest, she further approaches the shelf space so that she can interact with the product. The shopper trajectory features for approaching 466 reveal slow and lateral motion toward the product. When the shopper interacts with the product, the position is clearly very close to either side of the aisle space. The shopper almost stops; even if there is any motion, it does not have any dominant direction. The shopper trajectory features for interaction 467 show such behavior.

Figure 7:
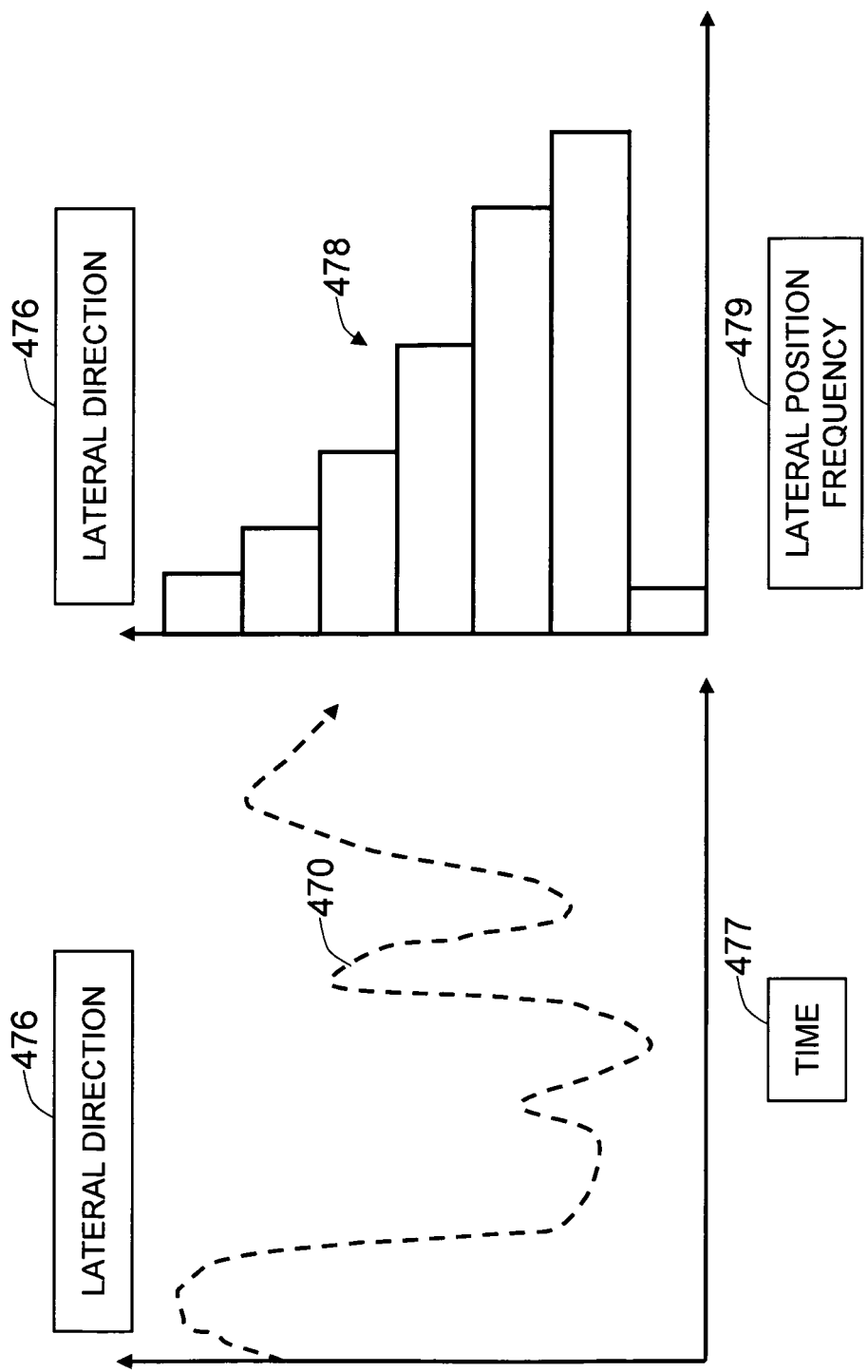
FIG. 7 shows an exemplary scheme of constructing a lateral position histogram.

FIG. 7 shows an exemplary scheme of constructing a lateral position histogram 478. The lateral trajectory projection 472 step converts any shopper trajectory 420 into a lateral trajectory 470, where only the motion to the lateral direction 476 is preserved and is shown over time. In the lateral position histogram 478, the length of the lateral direction 476 of the aisle (the distance between the L-shelf and the R-shelf) is divided into bins of an equal distance. Then each bin counts the number of lateral trajectory instances that fall on that bin. The resulting number is called the lateral position frequency 479. As the relation between the lateral trajectory 470 and the lateral position histogram 478 suggests, slower and frequent movement contributes to a higher lateral position frequency 479. In the majority of cases, the interaction stage causes a higher frequency to the corresponding sides of the aisle. In the figure, for example, the position close to the R-shelf (bottom) receives the highest lateral position frequency 479.

On the other hand, a long tail in the histogram typically is translated into a fast walk or short stay in that portion in the lateral direction 476. Therefore, a presence of such long tail in slow trajectory can mean a likely browsing behavior.

Figure 8:
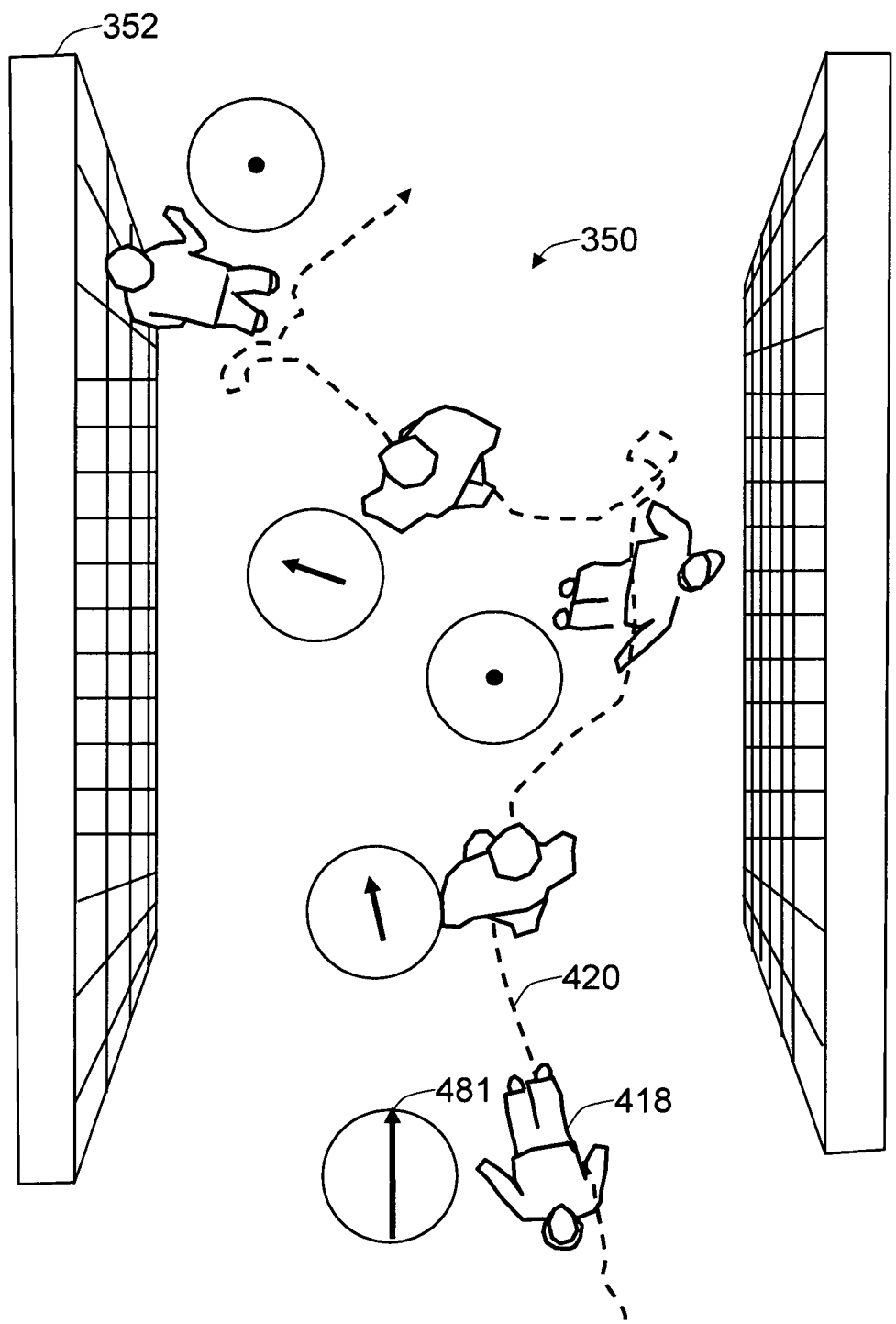
FIG. 8 shows a typical behavior of a shopper in a retail aisle, where the observed behavior provides an informative cue to the construction of the shopper behavior model.

FIG. 8 shows a typical behavior of a shopper in a retail aisle 350, where the observed trajectory and behavior provides informative cues to the design of a shopper behavior model 510. In the figure, a shopper 418 first walks along the aisle 350 (walking 512 stage), generating a shopper trajectory 420 typically not far from the median of the aisle. At this state, the shopper intends to go to a specific product category she has in mind. Therefore, the shopper walks fast without a need to slow down to closely look for any particular products along the way. Each arrow in a circle in the figure represents the velocity 481 of the shopper's movement at that stage. When the shopper is in the category, she slows down to look for products to examine or pick up. The shopper either approaches the shelf 352 that potentially has the product of interest, or stands back to have a better view of the target shelf 352. This stage is called browsing 514. The shopper significantly slows down to find the products, but the orientation of the movement does not diverge too much from the walking motion. The shopper may also stop and take time to look for products.

Once the shopper finds the desirable products, she approaches the particular shelf space more closely to pick up the product. This is called the approaching 516 stage. The approaching stage is again slow, due to the constrained aisle space between the shelves, but the direction of movements is typically significantly different from the direction of the aisle.

The next step is the interaction 518 stage, where the shopper picks up and examines the product to make a decision. The movement is inevitably very close to a halt, without any dominant directions.

The trajectories of shoppers are being analyzed in the shopper behavior analysis 550 step based on these identified steps of shopper behavior.

Figure 9:
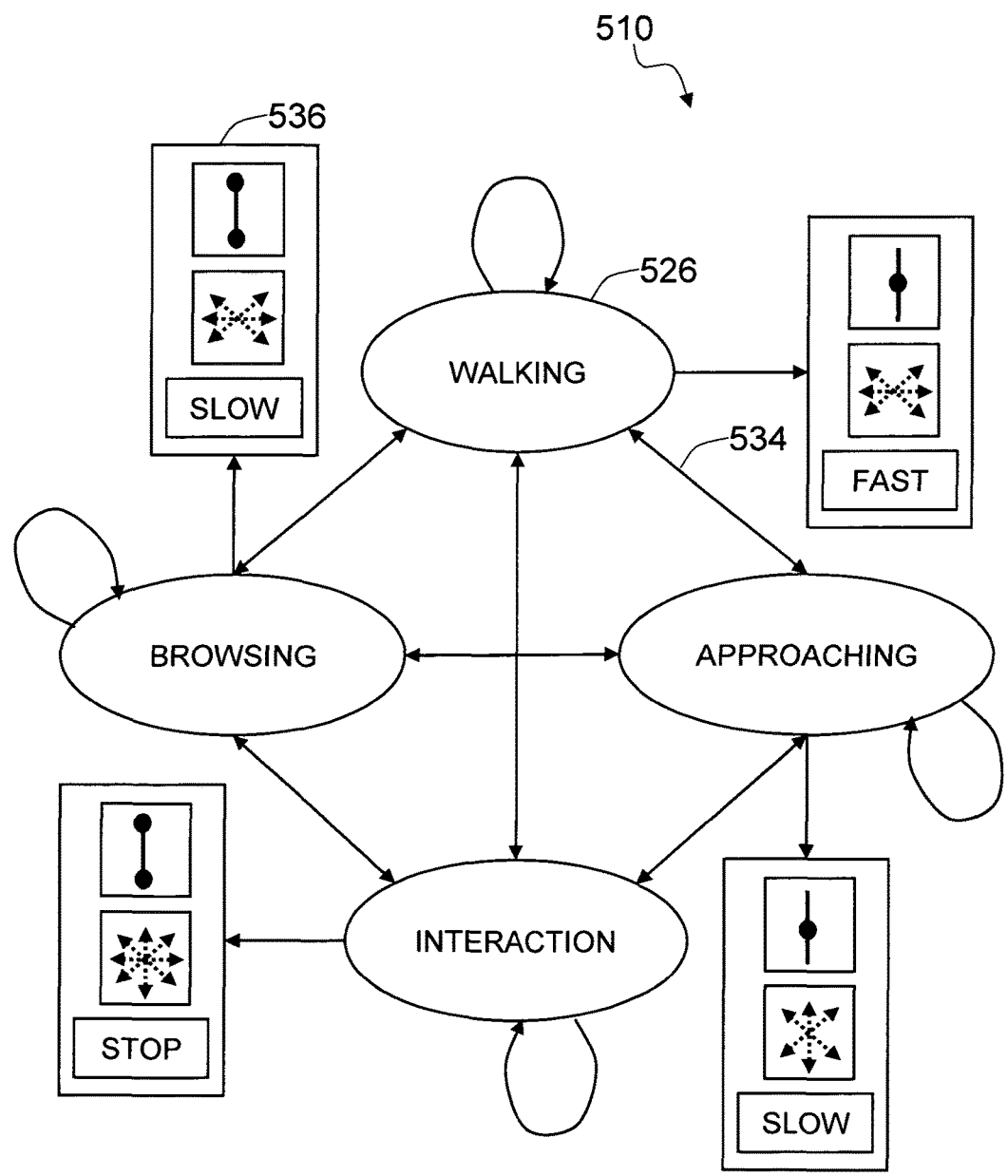
FIG. 9 shows an exemplary embodiment of the shopper behavior model that is illustrated using a finite state machine.

FIG. 9 shows an exemplary embodiment of the shopper behavior model 510 that is illustrated using a finite state machine. The four shopper behavior states 526—walking, browsing, approaching, and interaction—are the nodes of the model, and all of the possible state transitions 534 are marked by arrows. The model can represent all of the possible scenarios (progressions of states) during shopping, using the transitions of these states. The rectangles represent the typically observed shopper trajectory features 536 when the shopper is in the corresponding state (corresponded by uni-directional arrows). The observed shopper trajectory features 536 include the lateral (direction perpendicular to the aisle) position of the shopper (top), the dominant orientation of the movement (middle), and the speed of the movement (bottom).

The state progression of a shopper's behavior can be determined based on the illustrated relationship between the states and the observed features. For example, if the shopper is staying on either side of the aisle, and moving slowly to roughly the direction of the aisle, then the shopper is determined to be in a browsing state.

In one of the exemplary embodiments of the present invention, the state progression is estimated using the Hidden Markov Model 532. The model can be learned using a number of training data containing the shopper trajectories 422 along with ground truth states.

Figure 10:
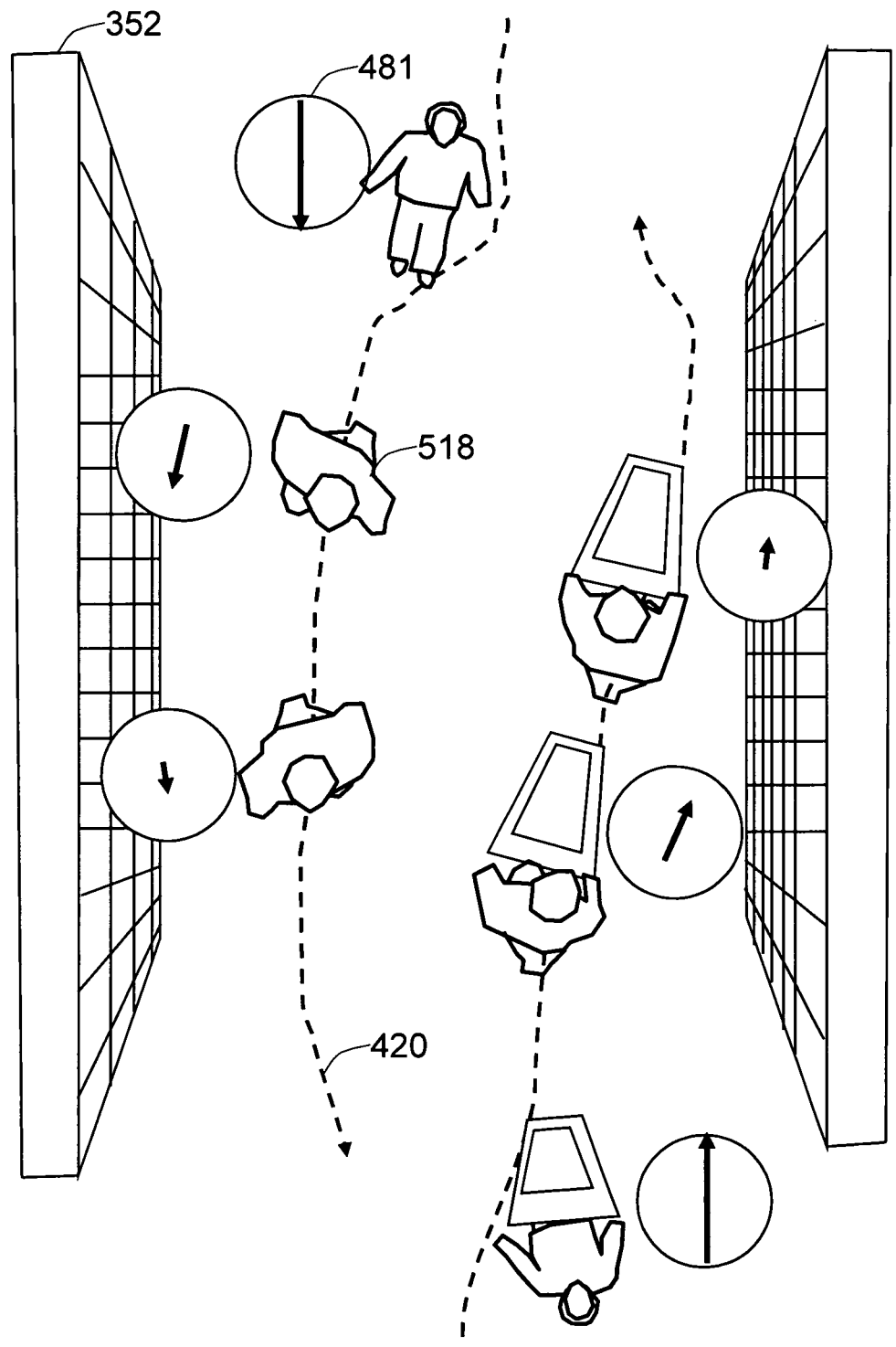
FIG. 10 shows an exemplary embodiment of the shopper behavior model.

FIG. 10 shows an exemplary embodiment of the shopper behavior model 510. The figure depicts a scenario wherein each shopper 518 shows behaviors different from normal shopping behavior due to their proximity and intended routes. They move to the opposite directions of each other and try to avoid close contact. The changes in velocity 481 are shown as arrows in circles. The resulting trajectories of these two shoppers reveal changes in lateral positions, directions, and speeds; the trajectories are pushed toward either sides of the aisle, and the speeds are decreased. Because the shopper behavior model 510 in the previous figure (FIG. 9) also depends on the same features, the model may recognize the trajectories as a valid shopping scene.

The shopper behavior model can therefore take into account this kind of scenario to achieve better accuracy.

Figure 11:
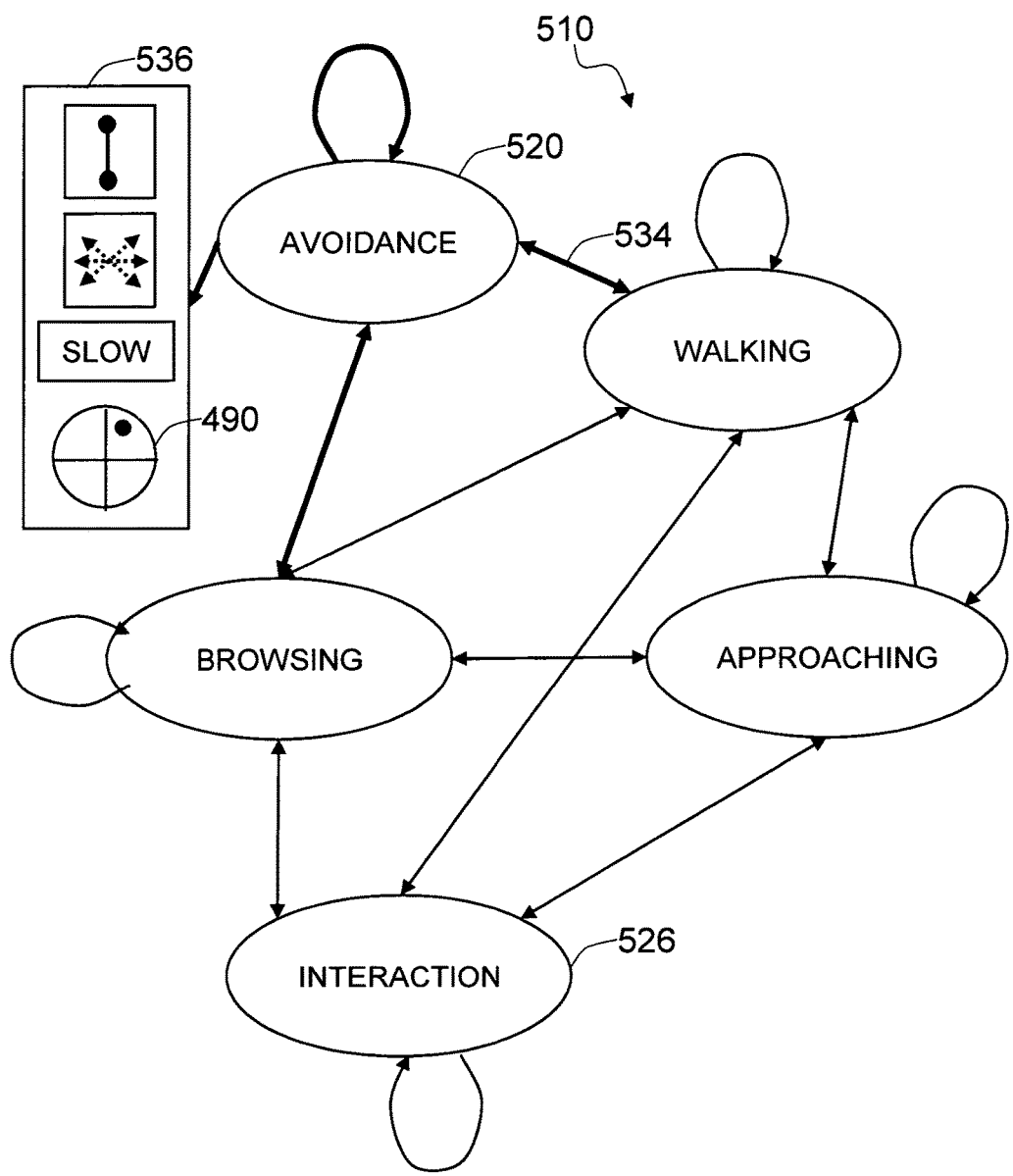
FIG. 11 shows an exemplary embodiment of the shopper behavior model that is illustrated using a finite state machine.

FIG. 11 shows an exemplary embodiment of the shopper behavior model 510 that is illustrated using a finite state machine. The model accounts for the scenario where two shoppers try to avoid each other in an aisle, as illustrated in FIG. 10. The model is augmented by a new state, referred to as the avoidance 520 state, to represent such behavior. The avoidance state 520 can be progressed from either the walking or browsing state in most cases. In this model, the observed shopper trajectory features 536 include proximity 490 to the nearest shopper. The proximity information is shown by the position of a dot (the nearest shopper) relative to the crosshair (the position of the shopper whose trajectory is being analyzed). The observed shopper trajectory features 536 belonging to other states also contain the proximity information. The augmented model can then accommodate the avoidance scenario. Though the avoidance state 520 is typically of less importance to shopper behavior analysis, an explicit modeling of the state improves the accuracy of recognizing other more interesting shopping behavior.

In one of the exemplary embodiments of the present invention, the state progression is estimated using the Hidden Markov Model 532. The model can be learned using a number of training data containing the shopper trajectories along with ground truth states.

Figure 12:
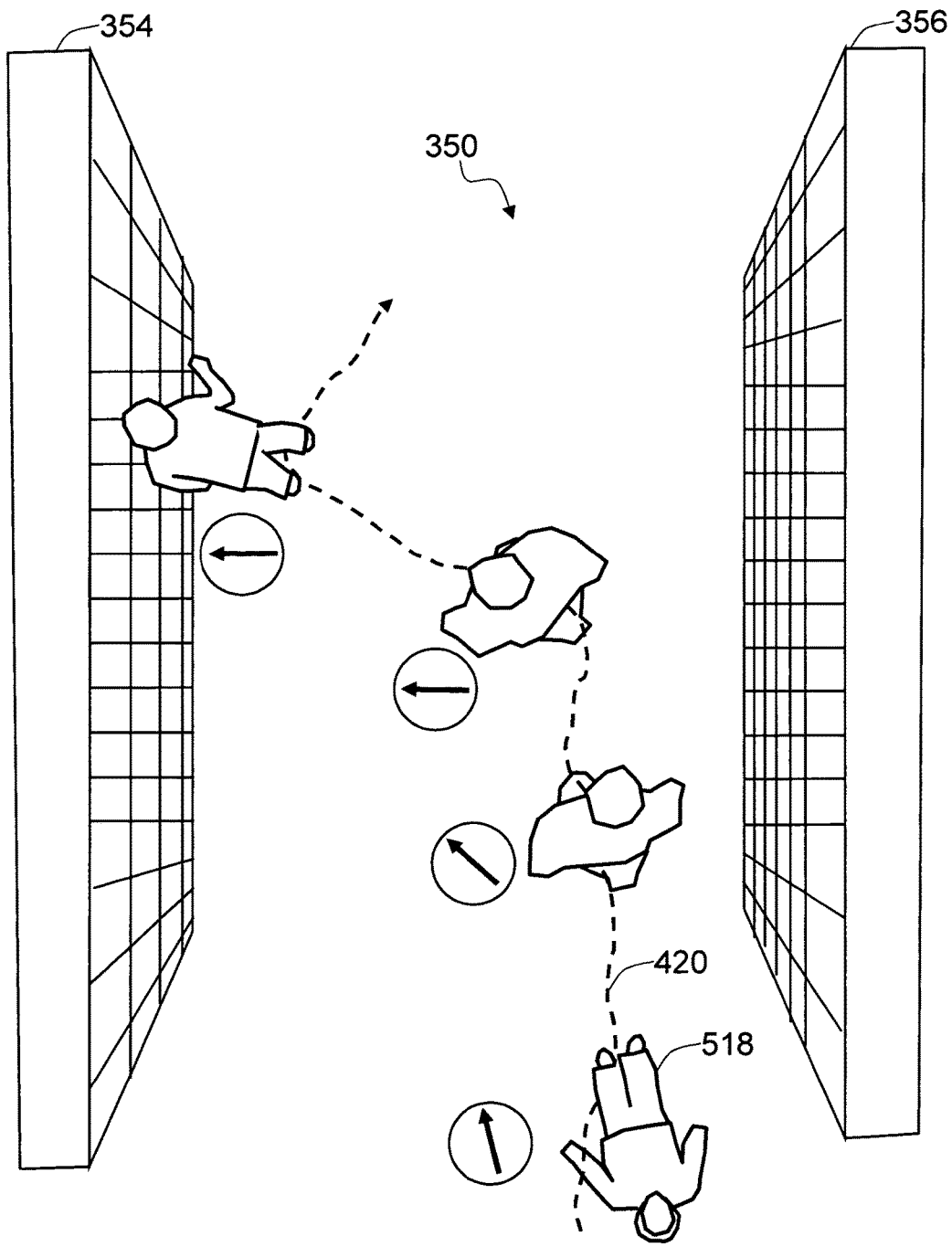
FIG. 12 shows an exemplary embodiment of the shopper behavior model.

FIG. 12 shows an exemplary embodiment of the shopper behavior model 510. This model addresses the problem of estimating the intention of the shopper 518 based on the trajectory. More specifically, on which side of the aisle the shopper intends to shop is the main focus of this model—the shopper may be interested in products on the L-shelf 354 or products on the R-shelf 356. In this particular instance of behavior, the shopper is interested in the L-shelf 354. Each of the arrows in circles represents the orientation of the shopper's interest at that instance. She walks into the area, finds the products, and approaches toward them. The trajectory 420 shows the shopper's intention to approach the L-shelf for the purpose of interacting with products there. The shopper behavior analysis 550 step will decode the trajectory—using the shopper behavior model—as a sequence of walking, browsing, approaching, and then interaction. However, the model in FIG. 9 does not distinguish between the shopper's intention to shop at the L-shelf and the intention to shop at the R-shelf. The model needs to be modified to make such a distinction.

Figure 13:
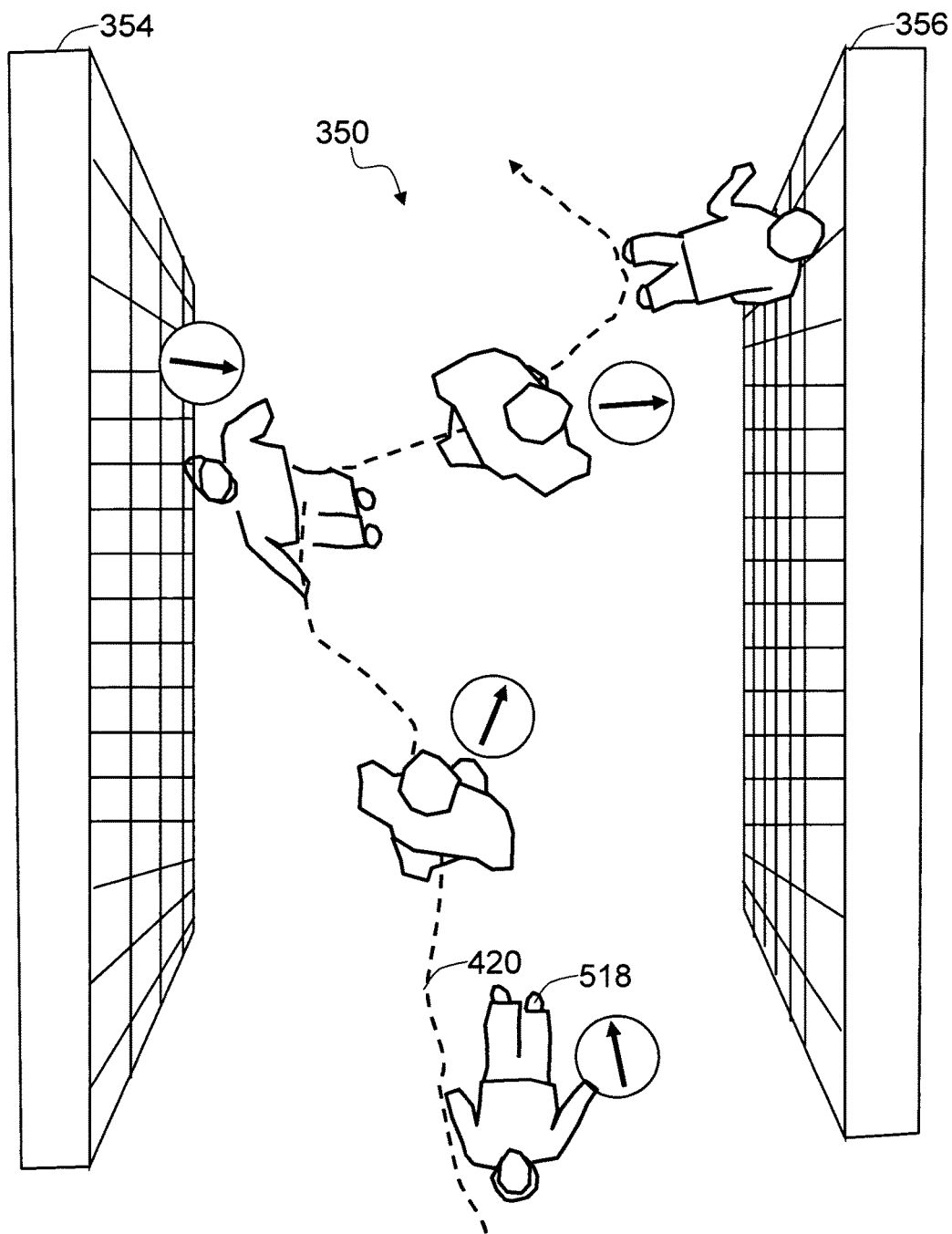
FIG. 13 shows an exemplary shopper behavior model.

FIG. 13 shows an exemplary shopper behavior model 510. This model addresses the problem of estimating the intention of the shopper based on the trajectory. The previous figure (FIG. 12) illustrated the scenario where a shopper is interested in products on the L-shelf 354. In this particular instance of behavior, the shopper is interested in the R-shelf 356. She walks into the area and slows down. Instead of directly approaching the R-shelf 356, she stands back from the R-shelf 356 to have a wider view of the shelf space in which she is interested. After taking time and finding the products, she finally approaches the R-shelf 356 and interacts with the products. The trajectory shows the shopper's intention to approach the R-shelf 356 for the purpose of interacting with products there. The shopper behavior analysis 550 step will decode the trajectory—using the shopper behavior model—as a sequence of walking, browsing, approaching, and then interaction. The decoded behavior will reveal that, in this case, the shopper was in the browsing step longer. Again, the model in FIG. 9 still does not distinguish between the shopper's intention to shop at the L-shelf 354 and the intention to shop at the R-shelf 354.

The trajectory in FIG. 13 and the trajectory in FIG. 12 show very similar shapes, but the shopper's intentions are different, as mentioned. The model needs to be augmented to make such a distinction.

Figure 14:
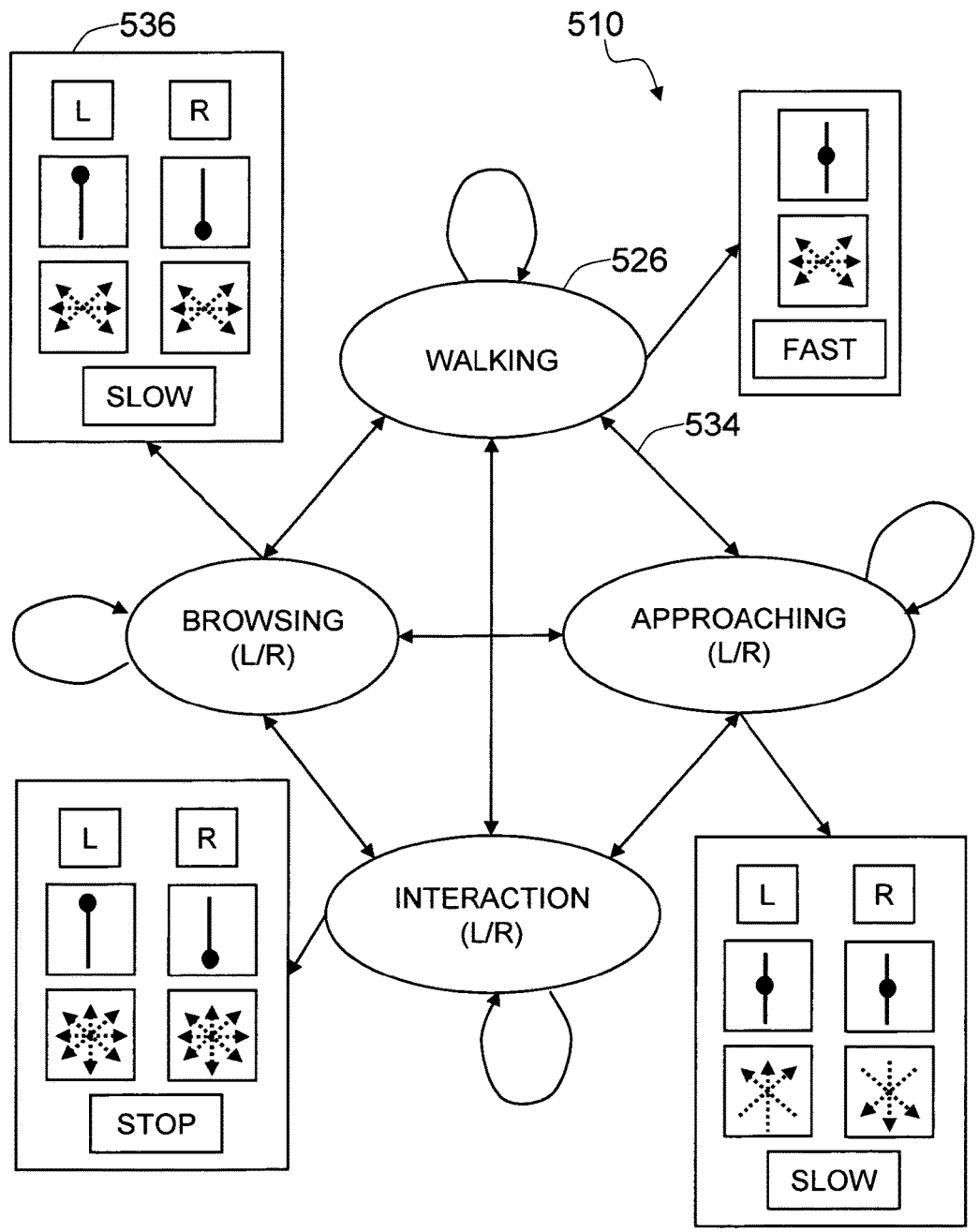
FIG. 14 shows an exemplary shopper behavior model that addresses the distinction between left shopping and right shopping.

FIG. 14 shows an exemplary shopper behavior model 510 that addresses the distinction between left shopping 522 and right shopping 524. All of the previous shopper behavior states 526, except the walking state, have been split into left and right states. In effect, the resulting states are: walking, L-browsing, R-browsing, L-approaching, R-approaching, L-interaction, and R-interaction. The observed features will be interpreted differently so as to make a distinction between the L-states and R-states. For example, the L-approaching and R-approaching will show opposite orientation of motions. The L-interaction and R-interaction will show clearly different position of the tracks; the L-interaction will cause the trajectory to stay very close to the left shelf. The speed of the trajectory will not show any distinction as can be easily construed.

On the other hand, the L-browsing and R-browsing may involve slow movements close to either shelf—there is still an ambiguity, because a shopper may browse for products at any distance from the target shelf. Neither does the direction of motion show much distinction. Therefore, L/R browsing can be identified based on the trajectory information before and after the browsing state.

Figure 15:
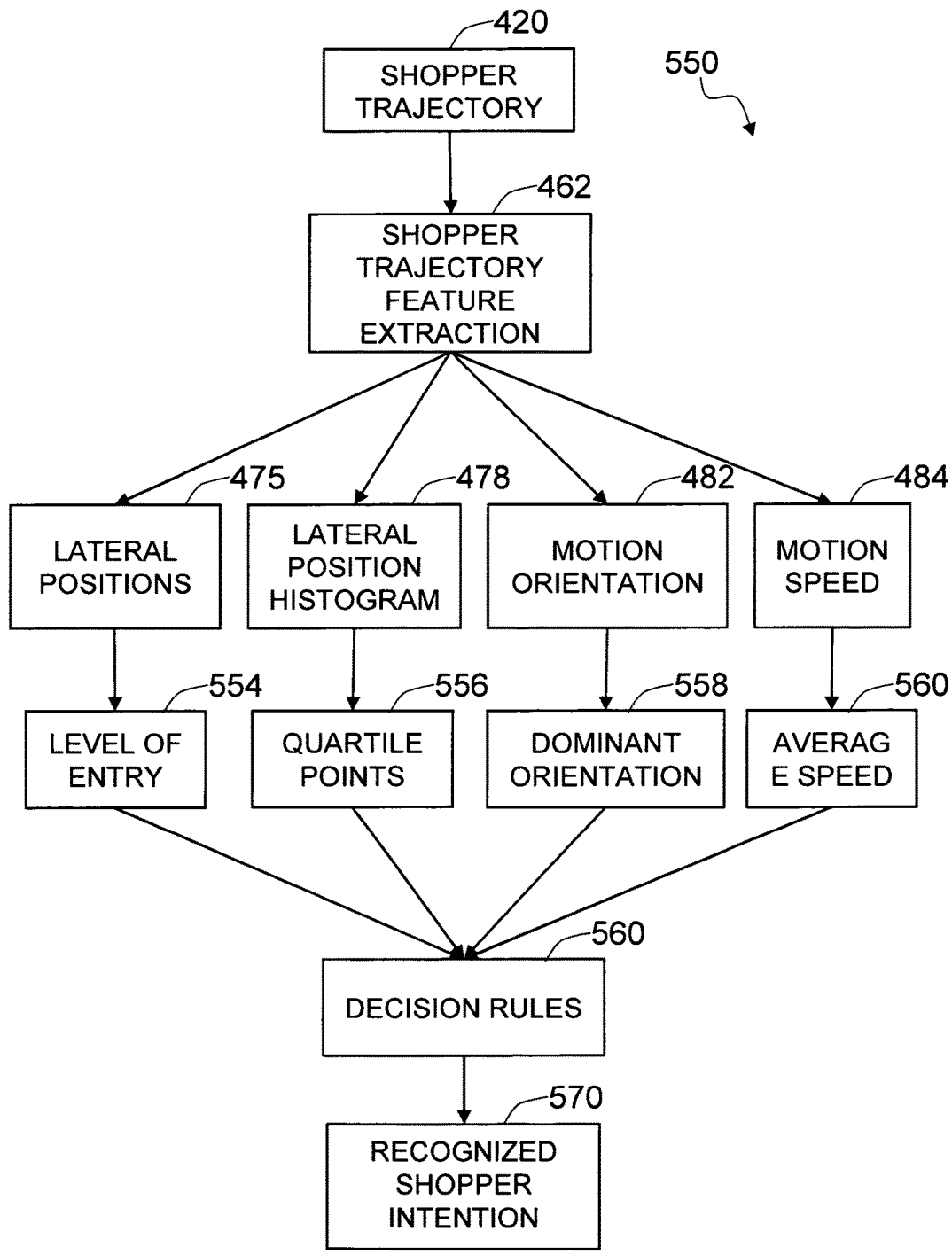
FIG. 15 shows an exemplary embodiment of the shopper behavior analysis based on a rule-based framework.

FIG. 15 shows an exemplary embodiment of the shopper behavior analysis 550 based on a rule-based framework. First, the shopper trajectory feature extraction 462 step generates a subset of the shopper trajectory features 460 from the shopper trajectory 420: lateral positions 475, lateral position histogram 478, motion orientation 482, and motion speed 484. From the sequence of lateral positions 475 extracted from the trajectory, the level of entry 554 is computed. The level of entry 554 is the lateral position at which the shopper enters the area of interest. The level of entry 554 represents the initial lateral position (between either shelves) when the shopper is in the walking stage, just before switching to the browsing stage. The level of entry can become a reference position to analyze the shopper's further movement.

From the lateral position histogram, the quartile points 556 are extracted. The quartile points are 25% percentile, 50% percentile, and 75 percentile points. The relative positions of these points deliver information about whether or not the histogram has a long tail. A long tail to one side typically means the shopper had brief movement to that side, typically for browsing.

From the motion orientation 482 and motion speed 484, the dominant orientation 558 and the average speed 560 are computed. The dominant orientation 558 and the average speed 560 of the shopper movement carry information about the intended destination for the shopper's movement.

The decision rules 552 then consider all of the extracted information—level of entry 554, quartile points 556, dominant orientation 558, and average speed 560—and finally recognize the shopper intention 570.

Figure 16:
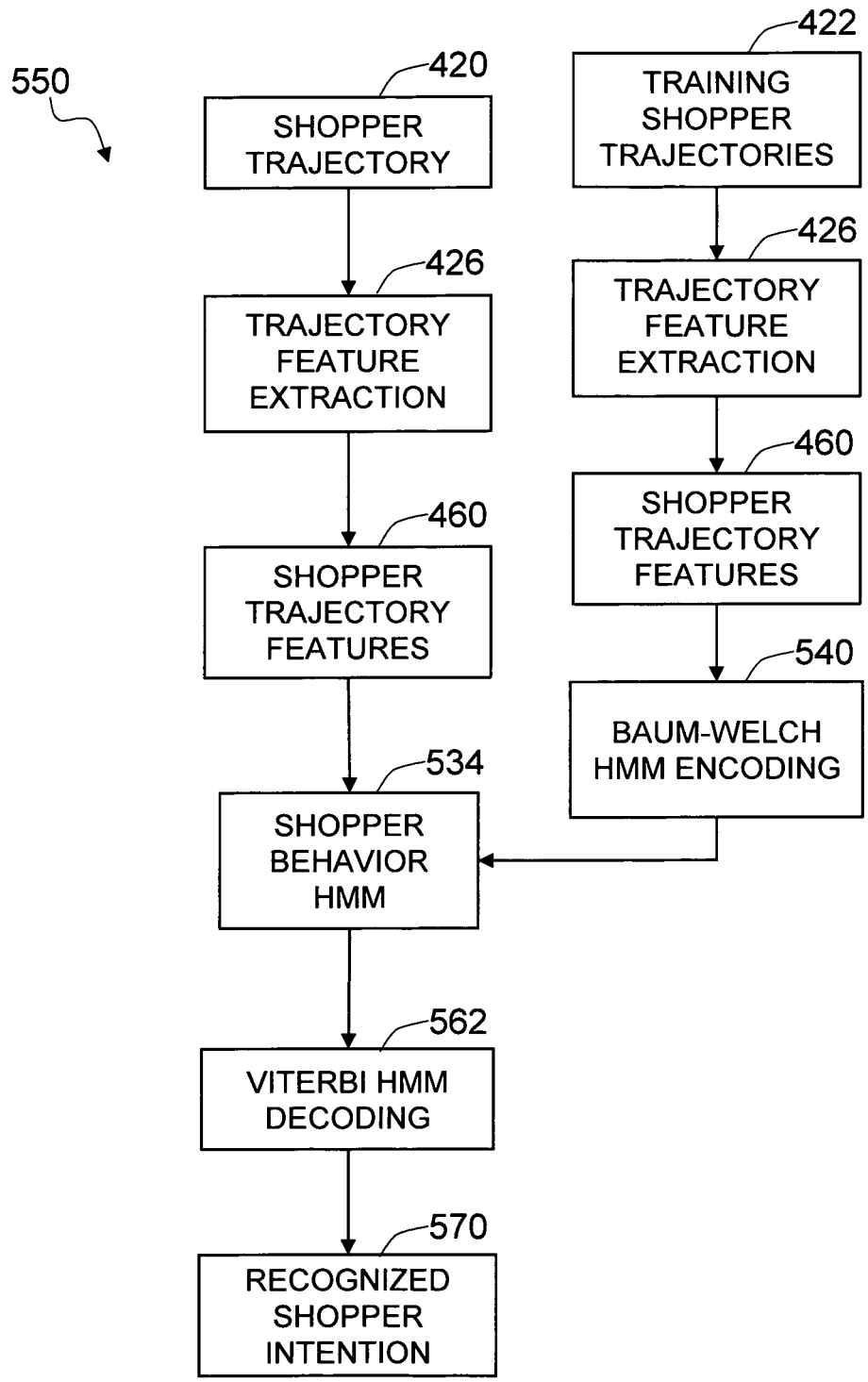
FIG. 16 shows an exemplary embodiment of the shopper behavior analysis based on a HMM (Hidden Markov Model) framework.

FIG. 16 shows an exemplary embodiment of the shopper behavior analysis 550 utilizing a HMM (Hidden Markov Model) framework. First, many training shopper trajectories 422 are annotated with ground truth shopper behavior states 526. The shopper trajectory feature extraction 462 step then derives the shopper trajectory features 536 of a given trajectory, such as position, speed of motion, and the orientation of motion. Then the shopper trajectory features 460 are used to train the HMM using the Baum-Welch HMM encoding 540 algorithm.

Then, given any shopper trajectory 420, the same shopper trajectory feature extraction 462 step derives the shopper trajectory features 460. The trajectory features are then fed to the trained shopper behavior HMM 534 to decode the state progression using the Viterbi HMM decoding 562 algorithm. Based on the decoded state progression, the intention of the shopper 570 can be recognized.

Figure 17:
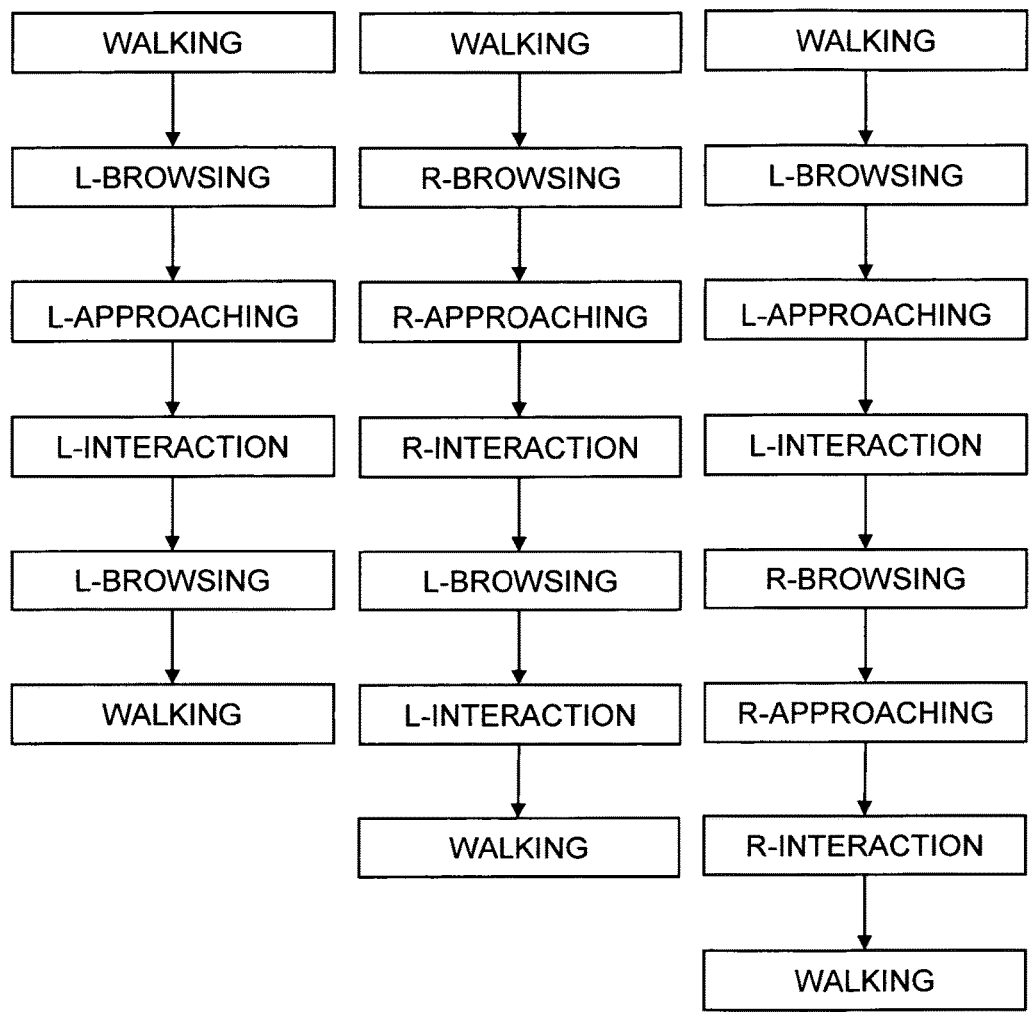
FIG. 17 shows exemplary instances of shopping sequence decoded from the shopper behavior analysis step.

FIG. 17 shows exemplary instances of a shopping sequence decoded from the shopper behavior analysis 550 step. The left shopping sequence starts with the walking stage. In this shopping instance, the shopper is interested in products on the L-shelf. The shopper simply approaches the shelf space and interacts with products. She then further browses for different products and walks away.

In the middle shopping sequence, the shopper is initially interested in products on the R-shelf and then shifts interest to the products on the L-shelf. The progression of the shopping stages reflects the changes in interests.

In the right shopping sequence, the shopper again shifts interests, from the L-shelf to the R-shelf, in this case. However, she shows more explicit approaching behavior when approaching the R-shelf space for interaction.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for determining a shopper's intention in an aisle, based on the shopper's trajectory, comprising the following steps of:
   a) providing a hardware comprising at least a camera, a plurality of machine learning-based human body detectors or a multi-hypothesis tracker, a computer processor and a set of computer vision algorithms wherein the camera captures a plurality of images, and the plurality of machine learning-based human body detectors or a multi-hypothesis tracker detects a set of people across the plurality of images, and wherein the computer processor tracks the shopper trajectories of the set of people, extracts shopper trajectory features, and analyzes the shopper trajectory features for shopper behaviors, wherein the hardware determines the shopper's intention in the aisle by the steps of:
   b) setting up a shopper behavior model,
   wherein the shopper behavior model consists of a relationship between shopper trajectory dynamics and atomic behaviors,
   wherein the shopper trajectory dynamics comprise position, speed, and orientation,
   c) detecting and tracking the shopper from input images captured by the camera to generate a trajectory of the shopper,
   d) converting the shopper trajectory into a lateral trajectory wherein the lateral trajectory into y and t coordinates, wherein y coordinates are in the direction perpendicular to an aisle and t coordinates are instances of time,
   e) extracting shopper trajectory features from the trajectory, wherein the shopper trajectory features include spatiotemporal dimensions, and
   f) analyzing the shopper trajectory features of the shopper's trajectory based on the shopper behavior model to determine the shopper's behavior state,
   wherein the lateral direction is a direction perpendicular to the aisle direction, and
   wherein the shopper trajectory features comprise lateral position, lateral position histogram, motion orientation, and motion speed.

2. The method according to claim 1, wherein the method further comprises a step of utilizing proximity to a nearest shopper as a part of the shopper trajectory features,
   wherein the shopper behavior model is augmented with a state for avoidance between shopper trajectories, wherein the state of avoidance distinguishes avoiding another shopper from another shopping behavior comprising browsing or approaching.

3. The method according to claim 1, wherein the method further comprises a step of constructing the lateral position histogram by dividing the lateral distance between shelves in an aisle into bins of an equal size,
   wherein the number of lateral trajectory instances is counted for each bin, wherein the number of lateral trajectory instances in each bin indicates the amount of time spent at the lateral position, and wherein the number of lateral trajectory instances in each bin identifies the shopper behavior.

4. The method according to claim 1, wherein the method further comprises a step of setting up the shopper behavior model with states for walking, browsing, approaching, interaction, and avoidance as behavioral primitives of the shopper behavior model,
   wherein each state of the shopper behavior model is associated with typically observed shopper trajectory features, and
   wherein the shopper trajectory features include a lateral position of a shopper.

5. The method according to claim 1, wherein the method further comprises a step of setting up the shopper behavior model with states for left-browsing, right-browsing, left-approaching, right-approaching, left-interaction, and right-interaction as primitives of the shopper behavior model, wherein the primitives distinguish between two similar trajectories with different shopper intentions,
   wherein each state of the shopper behavior model is associated with typically observed shopper trajectory features, and
   wherein the observed shopper trajectory features are differentiated between left states and right states.

6. The method according to claim 1, wherein the method further comprises the following steps of:
   a) annotating training shopper trajectories with ground truth shopper behavior states,
   b) extracting training shopper trajectory features from the training shopper trajectories, and
   c) training a Hidden Markov Model (HMM) framework using the Baum-Welch HMM encoding algorithm with the training shopper trajectory features.

7. The method according to claim 1, wherein the method further comprises a step of using a rule-based model to analyze the shopper trajectory features, wherein decision rules in the rule-based model are constructed based on an initial lateral position between shelves in the aisle, relative positions of quartile points in the lateral position histogram, and a destination information derived from a dominant motion orientation and an average motion speed.

8. The method according to claim 1, wherein the method further comprises a step of computing a level of entry from a sequence of lateral positions, quartile points from the lateral position histogram, a dominant motion orientation, and an average motion speed.

9. An apparatus for determining a shopper's intention in an aisle, based on the shopper's trajectory, comprising:
  a) providing a hardware comprising at least a camera, a plurality of machine learning-based human body detectors or a multi-hypothesis tracker, a computer processor and a set of computer vision algorithms wherein the camera captures a plurality of images, and the plurality of machine learning-based human body detectors or a multi-hypothesis tracker detects a set of people across the plurality of images, and wherein the computer processor tracks the shopper trajectories of the set of people, extracts shopper trajectory features, and analyzes the shopper trajectory features for shopper behaviors, wherein the hardware determines the shopper's intention in the aisle by the steps of:
  b) setting up a shopper behavior model,
  wherein the shopper behavior model consists of a relationship between shopper trajectory dynamics and atomic behaviors,
  wherein the shopper trajectory dynamics comprise position, speed, and orientation,
  c) detecting and tracking the shopper from input images captured by the camera to generate a trajectory of the shopper,
  d) converting the shopper trajectory into a lateral trajectory wherein the lateral trajectory into y and t coordinates, wherein y coordinates are in the direction perpendicular to an aisle and t coordinates are instances of time,
  e) extracting shopper trajectory features from the trajectory, wherein the shopper trajectory features include spatiotemporal dimensions, and
  f) analyzing the shopper trajectory features of the shopper's trajectory based on the shopper behavior model to determine the shopper's behavior state,
  wherein the lateral direction is a direction perpendicular to the aisle direction, and
  wherein the shopper trajectory features comprise lateral position, lateral position histogram, motion orientation, and motion speed.

10. The apparatus according to claim 9, wherein the apparatus further comprises a computer for utilizing proximity to a nearest shopper as a part of the shopper trajectory features, wherein the shopper behavior model is augmented with a state for avoidance between shopper trajectories, wherein the state of avoidance distinguishes avoiding another shopper from another shopping behavior comprising browsing or approaching.

11. The apparatus according to claim 9, wherein the apparatus further comprises a computer for constructing the lateral position histogram by dividing the lateral distance between shelves in an aisle into bins of an equal size, wherein the number of lateral trajectory instances is counted for each bin, wherein the number of lateral trajectory instances in each bin indicates the amount of time spent at the lateral position, and wherein the number of lateral trajectory instances in each bin identifies the shopper behavior.

12. The apparatus according to claim 9, wherein the apparatus further comprises a computer for setting up the shopper behavior model with states for walking, browsing, approaching, interaction, and avoidance as behavioral primitives of the shopper behavior model, wherein each state of the shopper behavior model is associated with typically observed shopper trajectory features, and wherein the shopper trajectory features include a lateral position of a shopper.

13. The apparatus according to claim 9, wherein the apparatus further comprises a computer for setting up the shopper behavior model with states for left browsing, right-browsing, left-approaching, right-approaching, left-interaction, and right-interaction as primitives of the shopper behavior model, wherein the primitives distinguish between two similar trajectories with different shopper intentions, wherein each state of the shopper behavior model is associated with typically observed shopper trajectory features, and wherein the observed shopper trajectory features are differentiated between left states and right states.

14. The apparatus according to claim 9, wherein the apparatus further comprising a computer that performs the following steps of:
  a) annotating training shopper trajectories with ground truth shopper behavior states,
  b) extracting training shopper trajectory features from the training shopper trajectories, and
  c) training a Hidden Markov Model (HMM) framework using the Baum-Welch HMM encoding algorithm with the training shopper trajectory features.

15. The apparatus according to claim 9, wherein the apparatus further comprises a computer for using a rule-based model to analyze the shopper trajectory features, wherein decision rules in the rule-based model are constructed based on an initial lateral position between shelves in the aisle, relative positions of quartile points in the lateral position histogram, and a destination information derived from a dominant motion orientation and an average motion speed.

16. The apparatus according to claim 9, wherein the apparatus further comprises a computer for computing a level of entry from a sequence of lateral positions, quartile points from the lateral position histogram, a dominant motion orientation, and an average motion speed.

* * * * *